(12) United States Patent
Hara

(10) Patent No.: US 7,561,850 B2
(45) Date of Patent: Jul. 14, 2009

(54) WIRELESS RECEIVING APPARATUS AND ANTENNA VERIFICATION METHOD

(75) Inventor: Yasunori Hara, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 499 days.

(21) Appl. No.: 11/511,355

(22) Filed: Aug. 29, 2006

(65) Prior Publication Data

US 2007/0076659 A1 Apr. 5, 2007

(30) Foreign Application Priority Data

Sep. 30, 2005 (JP) ............................. 2005-288584

(51) Int. Cl.
*H04B 7/00* (2006.01)
(52) U.S. Cl. ..................................... 455/69; 455/562.1
(58) Field of Classification Search .................. 455/69, 455/561, 562.1, 101, 115.1, 133–135, 269, 455/277.1–277.2; 375/267, 347
See application file for complete search history.

(56) References Cited

U.S. PATENT DOCUMENTS

| | | | |
|---|---|---|---|
| 6,611,675 B1 | 8/2003 | Salonen et al. | |
| 6,922,560 B1 | 7/2005 | Zhang | |
| 7,116,944 B2 * | 10/2006 | Das et al. | 455/69 |
| 2005/0152263 A1 | 7/2005 | Speth | |
| 2008/0153446 A1 * | 6/2008 | Isaac et al. | 455/269 |

FOREIGN PATENT DOCUMENTS

| | | |
|---|---|---|
| DE | 103 51 051 A1 | 6/2005 |
| JP | 2003-8552 | 1/2003 |
| WO | WO 2004/075434 | 9/2004 |

OTHER PUBLICATIONS

European Search Report dated Oct. 18, 2007.
Nagaraj S et al: "Antenna verification for closed loop transmit diversity in UMTS" Vehicular Technology Conference, 2004. VTC2004-Fall. 2004 IEEE 60th Los Angeles, CA USA Sep. 26-29, 2004, Piscataway, NJ, USA, IEEE, Sep. 26, 2004, pp. 3792-3796.

* cited by examiner

*Primary Examiner*—Thanh C Le
(74) *Attorney, Agent, or Firm*—McGinn IP Law Group, PLLC

(57) ABSTRACT

A wireless receiving apparatus according to an embodiment of the invention can communicate with a wireless transmitting apparatus that implements a closed-loop transmit diversity scheme using a first antenna and a second antenna. An antenna verification unit of the wireless receiving apparatus verifies a weight vector added to at least one of a signal sent from the first antenna and a signal from the second antenna by the wireless transmitting apparatus based on feedback information from the wireless receiving apparatus. Further, the antenna verification unit compares a reception signal with a plurality of weight vector candidate values that are determined based on a previously verified weight vector to select a weight vector set by the wireless transmitting apparatus from the plurality of candidate values, and if a weight vector added to a signal received from the wireless transmitting apparatus does not match a weight vector that is determined based on the feedback information in the past verification of the weight vector, verification is carried out by adding to the plurality of candidate values, a weight vector candidate value obtained when the weight vector determined in the past verification is assumed as the weight vector that is determined based on the feedback information.

13 Claims, 5 Drawing Sheets

WIRELESS RECEIVING APPARATUS AND ANTENNA VERIFICATION METHOD

BACKGROUND OF THE INVENTION

1. Field of the Invention

The present invention relates to a wireless communication system that adopts a closed-loop transmit diversity technique, and more particularly to an antenna verification carried out with a wireless receiving apparatus.

2. Description of Related Art

The diversity technique is promising as a technique capable of suppressing deteriorations in transmission quality of wireless communications, especially, mobile communications under the fading environment. As an example of the diversity technique, there is a transmit diversity technique. The transmit diversity technique is such that a wireless transmitting apparatus transmits signals from plural antennas, and a wireless receiving apparatus receives the transmission signals with a one-antenna. Upon the transmit diversity, the wireless transmitting apparatus generally needs to grasp a state of a transmission path to the wireless receiving apparatus prior to the signal transmission. A technique for grasping the transmission path condition based on feedback information from the wireless receiving apparatus is hereinafter referred to as "closed-loop transmit diversity".

For example, even 3GPP (3rd Generation Partnership Project) specifications as the W-CDMA (Wideband-Code Division Multiple Access) communication system standards adopts two closed-loop transmit diversity schemes: "mode 1" and "mode 2" (see Japanese Unexamined Patent Application Publication No. 2003-8552, for example). Among these, the closed-loop mode 1 implements the transmit diversity by use of two transmission antennas (hereinafter referred to as "first antenna" and "second antenna") in a wireless transmitting apparatus of a base station. A mobile station sends to base station, feedback information for controlling a phase of a transmission carrier from the second antenna so as to maximize received power of signals sent from the base station. In the closed-loop mode 1, an appropriate one is selected from four offset phase angles applied to a transmission carrier from the second antenna.

In the closed-loop mode 2 as well, similar to the closed-loop mode 1, the transmit diversity is implemented using two transmission antennas in the wireless transmitting apparatus of the base station. However, the mode 2 differs from the mode 1 in that an appropriate amplitude can be selected in addition to the phase angle of the transmission carrier from the second antenna, based on the feedback information sent from the mobile station. In the closed-loop mode 2, an appropriate one is selected from 8 phase angles of the transmission carrier from the second antenna, and an appropriate transmission carrier amplitude is selected from two amplitudes to thereby select a desired combination of phase and amplitude from 16 patterns.

Brief explanation is given of a conventional W-CDMA communication system that implements the transmit diversity in the closed-loop mode 1. FIG. 3 shows the configuration of a base station side wireless transmitting apparatus 5, and FIG. 4 shows the configuration of a mobile station side wireless receiving apparatus 7. First, the configuration of the wireless transmitting apparatus 5 of FIG. 3 is described. A channel encoding unit 51 receives a Dedicated Channel (DCH) data sequence as a transmission data sequence to execute channel encoding and bit-interleaving, and then multiplexes the channel data with individual pilot bits and control information such as a TPC (Transmit Power Control) command to generate a Dedicated Physical Channel (DPCH). Incidentally, the channel encoding unit 51 outputs data of two DPCHs (DPCH 1 and DPCH 2) to be sent from a first antenna 63 and a second antenna 64.

An antenna weight generator 52 generates weight vectors w1 and w2 to be multiplexed with the two DPCHs generated with the channel encoding unit 51 based on FBI (Feedback Information) bits from an FBI bit determining unit 53. The weight vectors w1 and w2 are multiplexed with the data of two DPCHs by the multipliers 55 and 56, making it possible to rotate a transmission carrier phase and give a phase offset angle to signals sent from the two antennas 63 and 64.

In the closed-loop mode 1, the phase offset angle φ between the transmission signal of the first antenna 63 and the transmission signal of the second antenna 64 is $\pi/4$, $-\pi/4$, $3\pi/4$, or $-3\pi/4$, and a combination of the weight vectors w1 and w2 is one of the following four patterns represented by Expression 1.

$$(w1, w2) = (1, \exp(j\phi)) \quad \phi \in \{\pi/4, -\pi/4, 3\pi/4, -3\pi/4\} \quad \text{Expression 1}$$

The FBI bit determining unit 53 determines an FBI bit value received from the mobile station. Here, the FBI bit means information for controlling the transmission carrier phase of the DPCH sent from the second antenna 64 such that the signals from the two antennas 63 and 64 of the wireless transmitting apparatus 5 are almost in phase at the receiving unit of the mobile station. The FBI bit is generated by the wireless receiving apparatus 7 as described below, and sent to the base station side wireless transmitting apparatus 5 by use of the up DPCH.

Incidentally, the closed-loop mode 1 defines the number of FBI bits in the up DPCH to 1 bit per slot of the DPCH. Thus, one of the above four phase offset angles is designated based on FBI bits corresponding to 2 slots of the DPCH. Provided that an FBI bit for even-numbered slots of the up DPCH is represented by FBI_e, and an FBI bit for odd-numbered slots is represented by FBI_o, the phase offset is defined based on the latest combination (FBI_e, FBI_o) as follows:

If (FBI_e, FBI_o)=(0,0), φ=π/4
If (FBI_e, FBI_o)=(0,1), φ=−π/4
If (FBI_e, FBI_o)=(1,0), φ=3π/4
If (FBI_e, FBI_o)=(1,1), φ=−3π/4

A spreading code generator 54 generates spreading codes for the two DPCHs. The multipliers 57 and 58 multiplex the spreading codes generated by the spreading code generator 54 with data of the two DPCHs.

A multiplexing unit 59 multiplexes the data of DPCH 1 to be sent from the first antenna 63 and data of a common pilot channel CPICH 1 to transmit the composite one to a transmitting unit 61. A multiplexing unit 60 synchronizes the data of the DPCH 2 to be sent from the second antenna 64 and data of a common pilot channel CPICH 2 to transmit the composite one to a transmitting unit 62. Here, the common pilot channel CPICH is a channel for transmitting a pilot symbol, and the CPICH 1 and the CPICH 2 are spread by use of the same spreading code, and orthogonalized by changing symbol patterns of the pilot signals.

The transmission signals multiplexed by the multiplexing units 59 and 60 are subjected to D/A conversion, quadrature modulation, and frequency conversion into an RF signal, and signal amplification at the transmitting units 61 and 62 and then transmitted from the first antenna 63 and the second antenna 64, respectively.

The configuration of the wireless receiving apparatus 7 of FIG. 4 is described next. A receiving unit 12 receives a reception signal from an antenna 11 to execute signal amplification, frequency conversion (down conversion), and orthogonal detection to obtain in-phase analog signal components and orthogonal analog signal components. The receiving unit 12 further executes A/D conversion on the in-phase analog signal components and the orthogonal analog signal components to output the converted ones to a DPCH despreading unit 13 and a CPICH despreading unit 14.

The DPCH despreading unit 13 despreads the components using the same spreading code as the spreading code used for the DPCH in the base station side wireless transmitting apparatus 5. The CPICH despreading unit 14 despreads the components using the same spreading code as the spreading code used for the CPICH in the wireless transmitting apparatus 5.

A phase comparator unit 15 calculates a phase difference by comparing the phase of the CPICH 1 sent from the first antenna 63 with the phase of the CPICH 2 sent from the second antenna 64. A FBI bit generating unit 16 determines a phase offset of the CPICH 2 sent from the second antenna 64 so as to minimize a phase difference between the CPICH 1 and the CPICH 2, and gives the FBI bit corresponding to the determined phase offset to the up DPCH to transmit the obtained one to the base station.

Incidentally, the number of FBI bits is set such that 1 bit is assigned to 1 slot of the up DPCH as described above. Thus, in the case of even-numbered slots, the FBI bit generating unit 16 determines whether the phase offset angle $\phi$ is 0 or $\pi$. If it is determined that $\phi=0$, FBI_e=0. On the other hand, if it is determined that $\phi=\pi$, FBI_e=1. Further, in the case of odd-numbered slots, the FBI bit generating unit 16 determines whether the phase offset angle $\phi$ is $\pi/2$ or $-\pi/2$. If it is determined that $\phi=\pi/2$, FBI_o=0. On the other hand, if it is determined that $\phi=-\pi/2$, FBI_o=1.

A first antenna channel estimation unit 17 estimates characteristics of a channel of the signal sent from the first antenna 63 to complement phase variations due to fading. A RAKE combination unit 22 described later combines plural multipath components. The respective multipath components are received through different channels and thus are subjected to different fading environments and differ from each other in terms of phase variations due to the fading. To that end, in order to execute synchronous detection, it is necessary to estimate the degree of phase variation of each path due to the fading to complement the variations.

In general, in the W-CDMA communication system that adopts the closed-loop transmit diversity scheme, a channel is estimated using a pilot symbol in the CPICH. The CPICH is a channel for transmitting the pilot symbol of a fixed pattern, and its transmission phase is known to the wireless receiving apparatus 7. Thus, a first antenna channel estimation unit 17 compares the transmission phase with a reception phase of the CPICH 1 which is sent from the first antenna 63 similar to the DPCH 1 to reach the wireless receiving apparatus 7 by way of the same channel as that for the DPCH 1 to obtain an estimate of the phase variations due to the fading. A multiplier 20 multiplexes a complex conjugate of the estimated values obtained by the first antenna channel estimation unit 17 with a data symbol of the DPCH from the DPCH despreading unit 13 to thereby complement the phase variations due to the fading.

A second antenna channel estimation unit 18 estimates characteristics of a channel of the signal sent from the second antenna 64 to complement phase variations due to fading. The second antenna channel estimation unit 18 compares the reception phase of the CPICH 2 for transferring a pilot symbol with the transmission phase similar to the first antenna channel estimation unit 17 to obtain an estimate of the phase variations due to the fading. Here, a phase offset is added to the DPCH 2 sent from the second antenna 64. Therefore, the second antenna channel estimation unit 18 needs to receive phase offset information from an antenna verification unit 79 to carry out channel estimation in consideration of the phase offset.

The antenna verification unit 79 receives the signals of the reception CPICH 2 and the reception DPCH 2 to verify the phase offset applied to the DPCH 2 by the base station side wireless transmitting apparatus 5. Here, the antenna verification means that the wireless receiving apparatus that receives the transmission signal based on the closed-loop transmit diversity scheme estimates a weight vector that is added to the transmission signal by the wireless transmitting apparatus.

As described above, in the transmit diversity scheme of the closed-loop mode 1, the DPCH 2 from the second antenna is given a phase offset as the weight vector. If an bit error occurs in the FBI bit sent from the mobile station to the base station, a phase offset that is given to the DPCH 2 by the base station is different from a phase offset that is designated by the mobile station based on the FBI bit. Thus, it is necessary to verify the phase offset applied by the base station through the antenna verification.

For example, in the closed-loop mode 1, the wireless receiving apparatus 7 of the mobile station verifies the phase offset that is applied to the DPCH 2 from the second antenna 64 by the wireless transmitting apparatus 5. The verification result is used for channel estimation at the second antenna channel estimation unit 18.

There are some antenna verification methods, one of which is described in 3GPP TS25.214 AnnexA. Hereinbelow, description is made of a method of verifying a phase offset applied to the down DPCH 2 by the base station while verifying 1 bit of the FBI bit for each slot.

Incidentally, the following description is given on the assumptions that FBI bits sent by the mobile station is 0 all the time and that the antenna verification is executed on the FBI bits of the even-numbered slots, i.e., FBI_e, no bit error is found in FBI bits of the odd-numbered slots as previous slots, which are received by the base station, and it is determined that FBI_o=0 at the base station.

If the base station receives the FBI bit with no bit error, an expected phase value to be added to the down DPCH2 is defined as a first candidate phase value, and if the base station receives the FBI bit with any bit error, an expected phase value to be added to the down DPCH2 is defined as a second candidate phase value. In other words, the first candidate phase value is $\pi/4$ radians since (FBI_e, FBI_o)=(0,0), and the second candidate phase value is $3\pi/4$ radians since (FBI_e, FBI_o)=(1,0).

The down CPICH 2 and the down DPCH 2 sent from the second antenna 64 reach the wireless receiving apparatus 7 through the same channel, so the degree of phase variation in the DPCH 2 due to the fading is equivalent to that in the CPICH 2. The phase of the DPCH 2 is further rotated by a phase offset. Assuming that a complex vector that represents an influence of the fading is $\beta$, the DPCH 2 and the CPICH 2 influenced by the fading are represented by $\beta$ (DPCH 2) and $\beta$ (CPICH 2), respectively. $\beta$ (CPICH 2) ideally becomes in phase with $\beta$ (DPCH 2) after rotated by an angle corresponding to a phase offset applied to the DPCH 2.

Based on the above properties, the antenna verification verifies a phase offset applied by the base station by determining which one of the complex vector phase obtained by rotating the phase of $\beta$ (CPICH 2) by the first candidate phase value and the complex vector phase obtained by rotating the phase of $\beta$ (CPICH 2) by the second candidate phase value is closer to the phase of $\beta$ (DPCH 2). Incidentally, the phase of β (DPCH 2) may be derived from the dedicated pilot bit multiplexed with the DPCH 2 and having a known symbol pattern.

To be specific, first, a first replica R1 of β (DPCH 2) is prepared by rotating a phase of β (CPICH 2) by the first candidate phase value, π/4 radians, and a second replica R2 of β (DPCH 2) is prepared by rotating a phase of β (CPICH 2) by the second candidate phase value, 3π/4 radians. The replicas R1 and R2 are represented by Expressions 2 and 3 below.

$$R1=\beta(CPICH2)\times\exp(j\pi/4) \quad \text{Expression 2}$$

$$R2=\beta(CPICH2)\times\exp(j3\pi/4) \quad \text{Expression 3}$$

Next, the correlation degree S1 between the first replica R1 and β (DPCH 2) and the correlation degree S2 between the second replica R2 and β (DPCH 2) are determined and compared with each other to thereby select a replica having a higher degree of correlation with β (DPCH 2), and a candidate phase value corresponding to the selected replica is determined as a phase offset applied on the base station side. Incidentally, the correlation degrees S1 and S2 may be other criteria for judgment, for example, the vector inner product between the replicas and β (DPCH 2) as long as the phase differences between the replicas R1 and R2, and β (DPCH 2) can be compared.

As a result of the above judgment, if the second candidate phase value is determined as the phase offset, the judgment result shows that a bit error occurs in the FBI bits received by the base station. To that end, it is necessary to update the value of the FBI bit (FBI_e) of the even-numbered slot for verification from 0 to 1 upon the antenna verification for a subsequent odd-numbered slot. In the case of updating FBI_e, the first candidate phase value for the subsequent odd-numbered slot is 3π/4 radians since (FBI_e, FBI_o)=(1,0), and the second candidate phase value is −3π/4 radians since (FBI_e, FBI_o)=(1,1).

FIG. 5 shows a processing flow example of the above antenna verification method. In step S501, the correlation degree S1 between β (DPCH 2) and the first replica R1 added with the first candidate phase value as the phase offset is calculated. In step S502, the correlation degree S2 between β (DPCH 2) and the second replica R2 added with the second candidate phase value as the phase offset is calculated. In step S503, the correlation degrees S1 and S2 are compared to select a phase offset with the higher correlation degree.

In step S504, it is determine whether or not the selected phase offset is the second candidate phase value. In the case of selecting the second candidate phase value, the bit error occurs in the FBI bit received by the base station, so the FBI bit value for subsequent antenna verification is updated (in step S505). That is, as described above, in the case of selecting the second candidate phase value upon the antenna verification for the even-numbered slot, the FBI bit value, FBI_e of the even-numbered slot is updated for verification of a subsequent odd-numbered slot. In step S506, the complex conjugate of the selected phase offset is output to the multiplier 21.

Referring back to FIG. 4, the RAKE combination unit 22 executes RAKE combination of multipath components the phase variations of which are complemented by the first antenna channel estimation unit 17 and the multiplier 20. Likewise, the RAKE combination unit 23 executes RAKE combination of multipath components the phase variations of which are complemented by the second antenna channel estimation unit 18 and the multiplier 21. Output values of the RAKE combination units 22 and 23 are added with an adder 24 and then input to a channel decoding unit 25. The channel decoding unit 25 deinterleaves and channel-decodes the input data sequence to output decoded data.

In the antenna verification carried out by the conventional wireless receiving apparatus 7, if it is erroneously determined that a bit error occurs in the FBI bit received by the base station, and a wrong phase offset is determined as a phase offset added to the DPCH2 by the base station, it is impossible to accurately perform channel estimation for the slot on which erroneous judgment is made. Further, upon the antenna verification for a slot subsequent to the slot concerned, the first candidate phase value and the second candidate phase value are generated using the FBI bit value updated on the basis of the erroneous judgment result. That is, if an erroneous judgment is made upon the antenna verification for a previous slot, none of the candidate phase values thereof match a phase offset set by the base station. Thus, if either the first candidate phase value or the second candidate phase value is selected through the antenna verification for a slot subsequent to the slot on which the erroneous judgment is made, correct channel estimation cannot be performed.

For example, in the case where an erroneous judgment is made upon the antenna verification for the even-numbered slot, the FBI bit value, FBI_e is erroneously updated to "1" upon the antenna verification for a subsequent odd-numbered slot. As a result, the first candidate phase value at the time of verification for the subsequent odd-numbered slot is 3π/4 radians since (FBI_e, FBI_o)=(1,0), and the second candidate phase value is −3π/4 radians since (FBI_e, FBI_o)=(1,1). However, the phase offset set by the base station is π/4 radians based on the FBI values (FBI_e, FBI_o)=(0,0), so none of the candidate phase values match the correct phase offset.

As described above, in the conventional antenna verification method, if an erroneous judgment is made upon the verification at a given timing (a given slot in the case of W-CDMA), the channel estimation cannot be accurately carried out not only at that timing but also at a subsequent timing when a candidate value of the phase offset is determined based on the result of antenna verification that reflects the result of the erroneous channel estimation.

As described above, the conventional antenna verification method has a problem that if an erroneous antenna verification is made at a given timing, this error influences channel estimation based on the result of subsequent antenna verification.

Incidentally, such problems arise not only in the closed-loop mode 1 of the above W-CDMA but also in other wireless communication systems that adopt a closed-loop transmit diversity scheme upon the antenna verification.

SUMMARY OF THE INVENTION

A wireless receiving apparatus according to an aspect of the invention can communicate with a wireless transmitting apparatus that implements a closed-loop transmit diversity scheme using a first antenna and a second antenna. The wireless receiving apparatus includes: an antenna verification unit verifying a weight vector added to at least one of a signal sent from the first antenna and a signal from the second antenna by the wireless transmitting apparatus based on feedback information from the wireless receiving apparatus. The antenna verification unit compares a reception signal with a plurality of weight vector candidate values that are determined based on a previously verified weight vector to select a weight vector set by the wireless transmitting apparatus from the plurality of weight vector candidate values. Further, if a weight vector added to a signal received from the wireless transmitting apparatus does not match a weight vector that is determined based on the feedback information in the past verification of the weight vector, the antenna verification unit execute verification by adding to the plurality of candidate values, a weight vector candidate value obtained when the weight vector determined in the past verification is assumed as the weight vector that is determined based on the feedback information.

According to the above configuration, even if an erroneous judgment is made in the past antenna verification, a correct weight vector can be selected with no influence of the erroneous judgment in the past antenna verification. Therefore, it is possible to correctly complement phase variations of reception signals based on the result of antenna verification after the erroneous judgment.

Further, an antenna verification method according to another aspect of the invention is executed by a wireless receiving apparatus capable of communicating with a wireless transmitting apparatus that implements a closed-loop transmit diversity scheme using a first antenna and a second antenna. In the method, a weight vector added to at least one of a signal sent from the first antenna and a signal from the second antenna by the wireless transmitting apparatus based on feedback information from the wireless receiving apparatus is selected from a plurality of weight vector candidate values that are determined based on a previously verified weight vector.

To be specific, first, it is determined whether or not a weight vector verified in the past verification of the weight vector matches a weight vector that is determined based on the feedback information. Next, if the weight vector verified in the past verification of the weight vector does not match the weight vector that is determined based on the feedback information, a plurality of weight vector candidate values are set with values including a weight vector candidate value obtained when the weight vector determined in the past verification is assumed as the weight vector that is determined based on the feedback information. Subsequently, a reception signal is compared with the plurality of weight vector candidate values to select a weight vector set by the wireless transmitting apparatus from the plurality of weight vector candidate values.

According to the above method, even if an erroneous judgment is made in the past antenna verification, a correct weight vector can be selected with no influence of the erroneous judgment in the past antenna verification. Therefore, it is possible to correctly complement phase variations of reception signals based on the result of antenna verification after the erroneous judgment.

Further, an antenna verification method according to still another aspect of the invention is executed by a wireless receiving apparatus capable of communicating with a wireless transmitting apparatus that implements a closed-loop transmit diversity scheme of a closed-loop mode 1 of W-CDMA using a first antenna and a second antenna. In the method, a phase offset added to the second antenna by the wireless transmitting apparatus based on an FBI bit from the wireless receiving apparatus is selected from a plurality of phase offset candidate values that are determined based on a previously verified phase offset.

To be specific, if a phase offset of a signal received from the wireless transmitting apparatus is determined not to match a phase offset based on the FBI bit upon verification of the phase offset in a previous time slot, a phase offset set by the wireless transmitting apparatus is selected from a first candidate phase value derived from a combination of a first FBI bit corresponding to a time slot as a verification target and a second FBI bit of a slot previous to the first FBI bit, a second candidate phase value derived from a combination of an inverted bit of the first FBI bit and the second FBI bit, and a third candidate phase value derived from a combination of the first FBI bit and an inverted bit of the second FBI bit. On the other hand, if a phase offset of a signal received from the wireless transmitting apparatus is determined matches a phase offset based on the FBI bit upon verification of the phase offset in a previous time slot, a phase offset set by the wireless transmitting apparatus is selected from the first candidate phase value and the second candidate phase value.

According to the above method, even if an erroneous judgment is made in the past antenna verification, a correct weight vector can be selected with no influence of the erroneous judgment in the past antenna verification. Therefore, it is possible to correctly complement phase variations of reception signals based on the result of antenna verification after the erroneous judgment.

According to the present invention, it is possible to provide a wireless receiving apparatus and an antenna verification method that can correctly execute channel estimation based on a result of subsequent antenna verification regardless of whether or not an erroneous judgment is made in the past antenna verification.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

Figure 1:
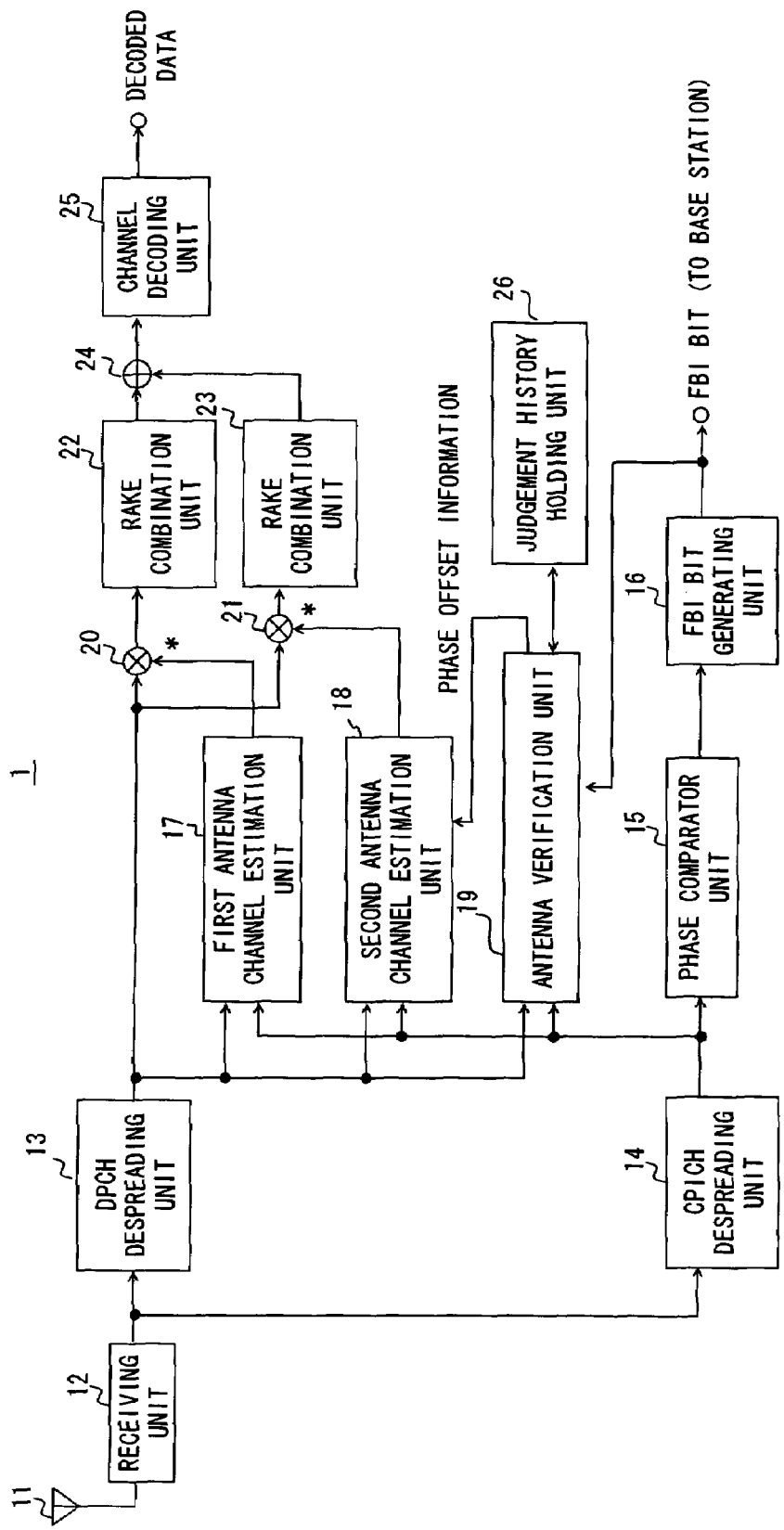
FIG. 1 is a schematic diagram of a wireless receiving apparatus according to an embodiment of the present invention.

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Incidentally, the same components are denoted by identical reference numerals throughout the accompanying drawings, and repetitive description about the same components is omitted if not necessary for ease of explanation. The following embodiments are realized by applying the present invention to a wireless receiving apparatus of a W-CDMA mobile communication system that adopts a transmit diversity scheme in a closed-loop mode 1.

First Embodiment

Figure 4:
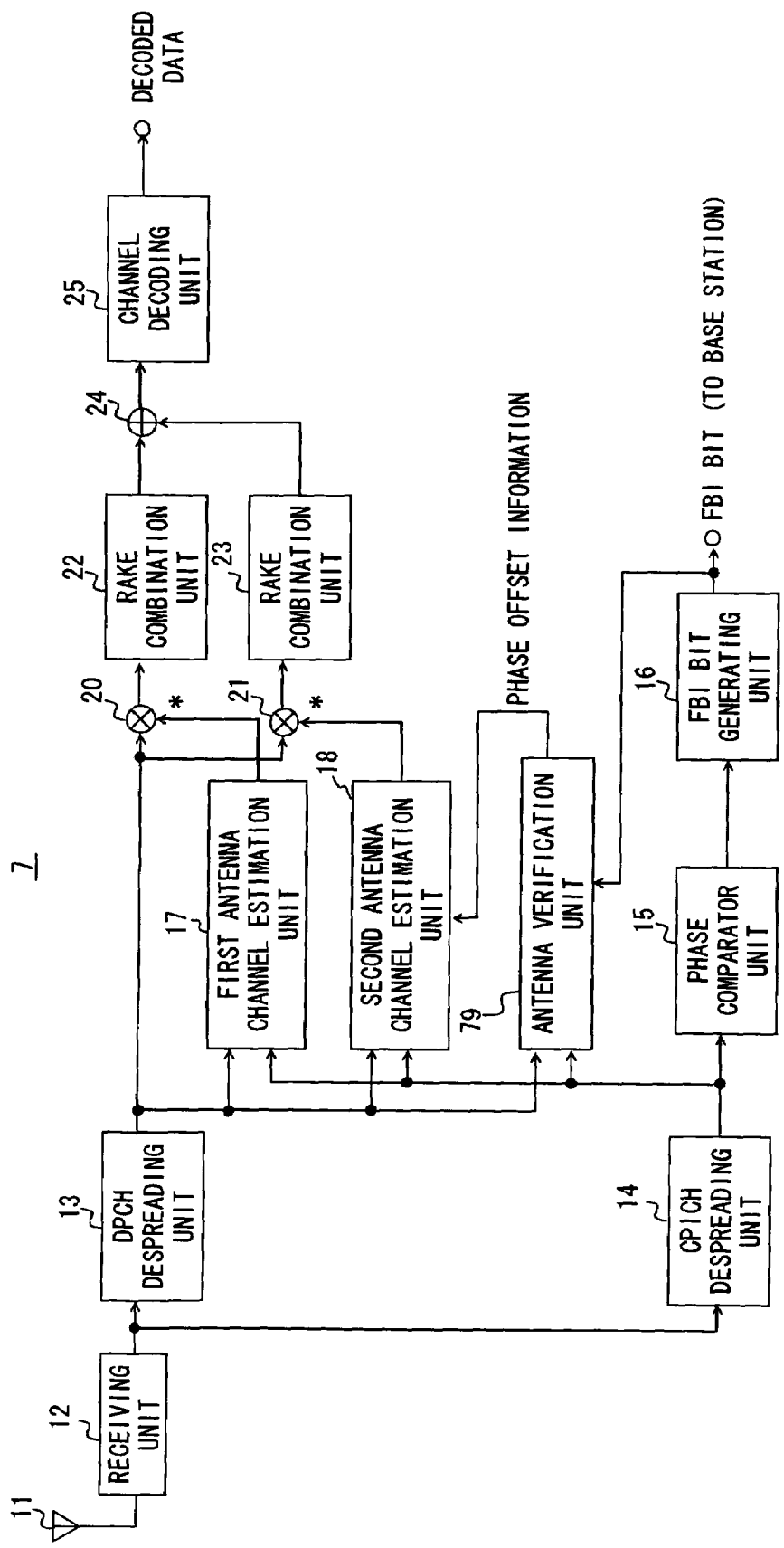
FIG. 4 is a schematic diagram of a conventional wireless receiving apparatus.

FIG. 1 shows the configuration of a wireless receiving apparatus 1 according to a first embodiment of the present invention. The wireless receiving apparatus 1 is applied to a mobile station of the W-CDMA communication system, and implements a transmit diversity scheme with a wireless transmitting apparatus 5 of the base station in the closed-loop mode 1. Incidentally, components of the wireless receiving apparatus 1 are the same as those of a conventional wireless receiving apparatus 7 of FIG. 4, except an antenna verification unit 19 and a judgment history holding unit 26, so these components are assigned with identical reference numerals and repetitive description thereof is omitted here.

The antenna verification unit 19 receives signals of a CPICH 2 and DPCH 2 from a DPCH despreading unit 13 and a CPICH despreading unit 14 to verify a phase offset applied to the DPCH 2 by the wireless transmitting apparatus 5.

The judgment history holding unit 26 is a memory for holding a judgment history of the antenna verification made by the antenna verification unit 19. More specifically, the judgment history holding unit 26 holds a judgment history of the past antenna verification that would influence the determination of a candidate phase offset value upon the antenna verification.

As described above, in the closed-loop mode 1 used in the wireless receiving apparatus 1 of this embodiment, the result of judgment for a given slot influences the determination of a candidate phase value upon the verification for a subsequent slot. Thus, the judgment history holding unit 26 may hold a history of the judgment for a previous slot. Therefore, for example, the judgment history holding unit 26 may be any memory insofar as the memory can store 1-bit flag information for determining whether or not a second candidate phase value is selected upon the antenna verification for a previous slot, in other words, whether or not it is determined that a bit error occurs in an FBI bit received by the base station.

Figure 2:
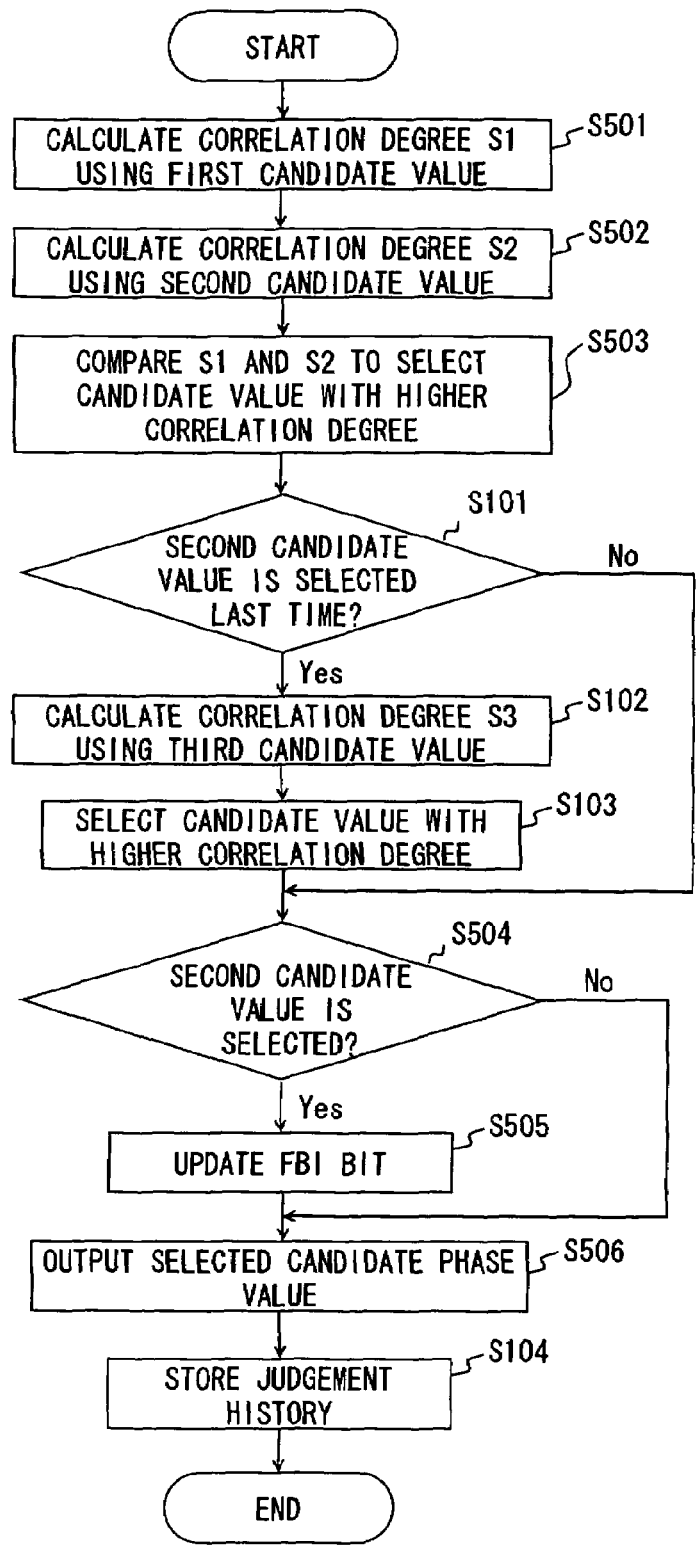
FIG. 2 is a flowchart of a processing flow of an antenna verification according to the embodiment of the present invention.
Figure 3:
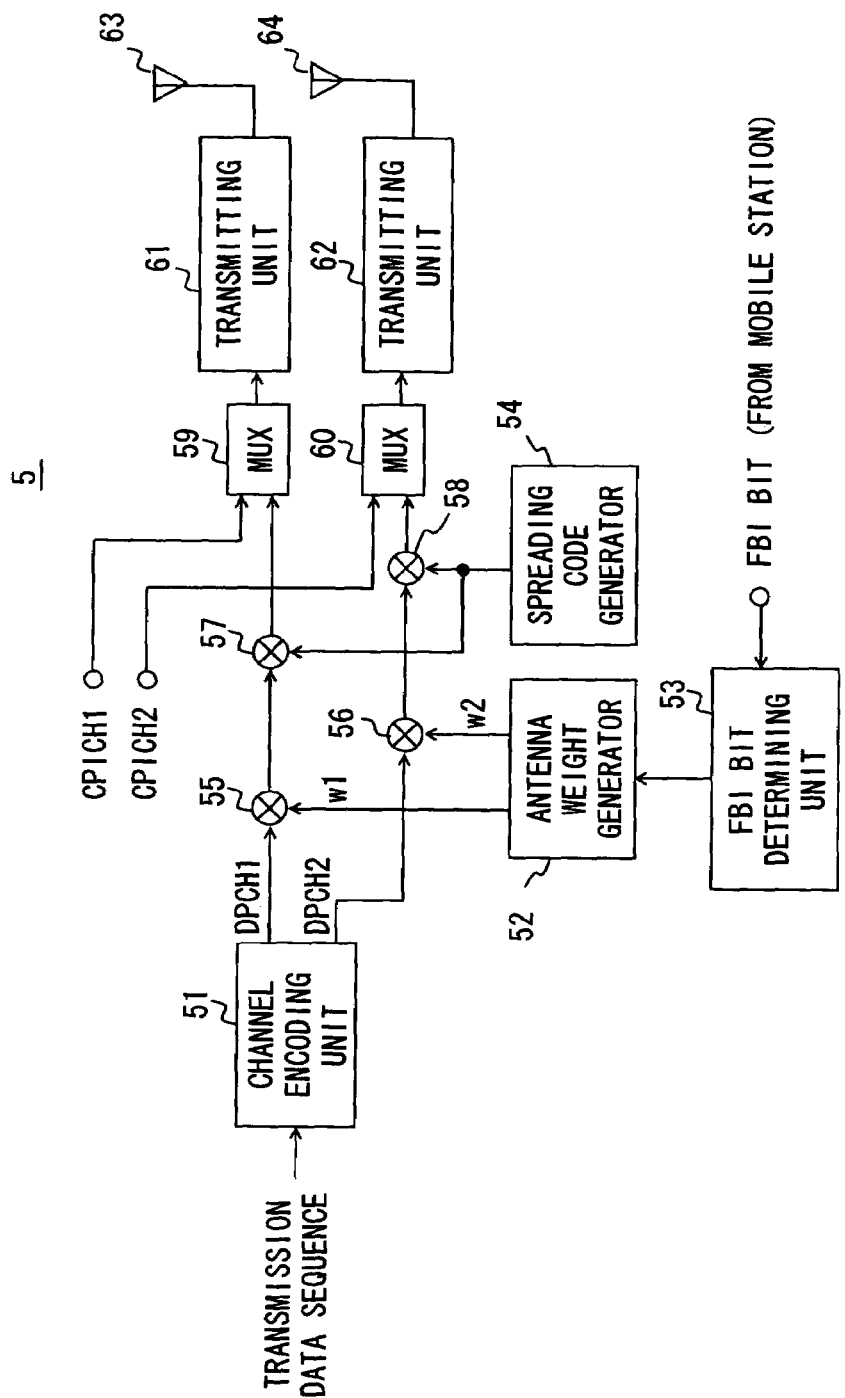
FIG. 3 is a schematic diagram of a conventional wireless transmitting apparatus.
Figure 5:
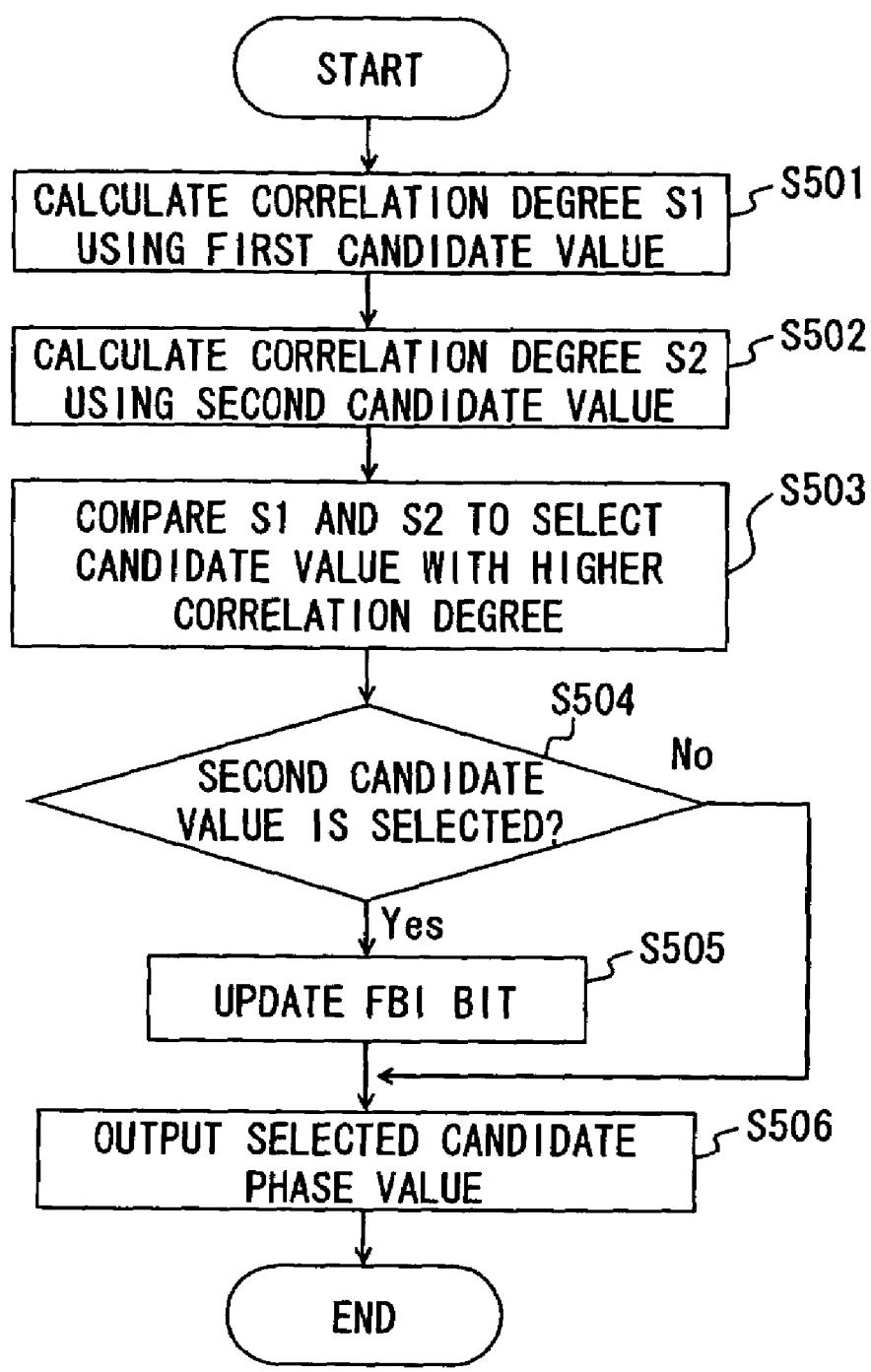
FIG. 5 is a flowchart of a processing flow of conventional antenna verification.

FIG. 2 shows a processing flow of antenna verification executed by the antenna verification unit 19. Incidentally, the same steps as those of a conventional antenna verification method of FIG. 5 are denoted by like reference symbols. In step S501, a correlation degree S1 between β (DPCH 2) and a first replica R1 prepared by rotating a target phase by a first candidate phase value as a phase offset is calculated. The first candidate phase value is an expected phase offset in the case where the base station receives FBI bits with no error.

In step S502, a correlation degree S2 between β (DPCH 2) and a second replica R2 prepared by rotating a target phase by a second candidate phase value as a phase offset is calculated. The second candidate phase value is an expected phase offset in the case where the base station receives FBI bits with any error.

In step S503, the correlation degrees S1 and S2 are compared to select the candidate phase offset value of the replica having the higher degree of correlation.

In step S101, it is determined whether the second candidate phase value is selected upon the previous antenna verification, and the FBI bit received at the base station is determined to involve a bit error. This determination is made with reference to the judgment history of the past antenna verification held in the judgment history holding unit 26.

If it is not determined that the bit error occurs in the FBI bit received at the base station upon the previous antenna verification, subsequent steps, steps S102 and S103 are skipped, and a processing from step S504 onward is carried out. The processing of steps S504 to S506 is the same as that of the conventional antenna verification method of FIG. 5. In the last step S104, the judgment history holding unit 26 holds the judgment history of the antenna verification.

On the other hand, if it is determined that a bit error occurs in the FBI bit received at the base station upon the previous antenna verification, the processing of steps S102 and S103 is executed. In step S102, a correlation degree S3 between β (DPCH 2) and a third replica R3 prepared by rotating a target phase by a third candidate phase value as a phase offset is calculated. Here, the third candidate phase value is an expected phase offset in the case where erroneous judgment is made upon the previous antenna verification, and no bit error occurs in the FBI bit received at the base station.

As an example, it is assumed that the value of the FBI bits sent from the mobile station is always 0, the FBI bit received at the base station is determined to involve a bit error upon the antenna verification for a given even-numbered slot, and the FBI bit value, FBI_e is updated to "1". In this case, at the time of verification for a subsequent odd-numbered slot, the first candidate phase value is $3\pi/4$ radians based on (FBI_e, FBI_o)=(1,0), and the second candidate phase value is $-3\pi/4$ radians based on (FBI_e, FBI_o)=(1,1).

If an erroneous judgment is made upon the antenna verification for the even-numbered slot, a phase offset added to the DPCH 2 sent from the second antenna 64 by the base station is $\pi/4$ radians based on (FBI_e, FBI_o)=(0,0). Thus, in the present invention, the offset value of $\pi/4$ radians that is calculated based on (FBI_e, FBI_o)=(0,0) is added as the third candidate phase value. At this time, the replica R3 is derived from Expression 4.

$$R3=\beta(CPICH2)\times\exp(j\pi/4) \quad \text{Expression 4}$$

In step S103, the correlation degree S1 or S2 calculated from the candidate phase value selected in step S503 is compared with the correlation degree S3 calculated from the third candidate phase value, and the candidate phase offset value with the higher degree of correlation is selected.

In this way, if it is determined that no bit error occurs in the FBI bit received by the base station upon the antenna verification for previous slots, the antenna verification unit 19 of the wireless receiving apparatus 1 of this embodiment executes antenna verification for subsequent slots by use of the first candidate phase value and the second candidate phase value as in the conventional case. On the other hand, if it is determined that a bit error occurs in the FBI bit received by the base station upon the antenna verification for previous slots, the antenna verification unit 19 executes the antenna verification for subsequent slots while adding a phase offset obtained in the case where the FBI bit is determined to involve no bit error upon the verification for previous slots, as the third candidate value. This is a feature of the verification unit of this embodiment.

In the above conventional antenna verification method, the result of past antenna verification is regarded as correct, and the FBI bit value for following antenna verifications is updated. As a result, if the result of past antenna verification is incorrect, the channel estimation cannot be accurately carried out for a slot on which the erroneous judgment is made. Furthermore, the channel estimation cannot be accurately carried out upon the following antenna verifications for determining a candidate phase offset value based on the past erroneous judgment result. That is, there is a problem that, once an erroneous judgment is made at the time of antenna verification, a correct phase offset value cannot be obtained even upon the next antenna verification based on the erroneous judgment result.

In contrast, the wireless receiving apparatus 1 of this embodiment adds a candidate phase offset value for the case where an erroneous judgment is made upon the antenna verification, to candidates of the next verification that would be influenced by the erroneous judgment result. Hence, even if an erroneous judgment is made in the past antenna verification, a correct phase offset value can be selected and the channel estimation can be accurately executed with no influence of the erroneous judgment. Therefore, it is possible to improve receiving characteristics of the wireless receiving apparatus in the case of implementing the closed-loop transmit diversity scheme.

Other Embodiments

The present invention is also applicable to a wireless receiving apparatus of a closed-loop mode 2 conforming to the 3GPP specifications of W-CDMA.

In the case of the closed-loop mode 2, a weight vector w1 for the signal of the DPCH 1 to be sent from the first antenna and a weight vector w2 for the signal of the DPCH 2 to be sent from the second antenna are represented by Expression 5 below.

$$(w1, w2) = (\sqrt{p1}, \sqrt{p2}\exp(j\phi)) \; \phi \in \{\pi, -3\pi/4, -\pi/2, -\pi/4, 0, \pi/4, \pi/2, 3\pi/4\} \quad \text{Expression 5}$$

In Expression 5, p1 represents a transmission power of the first antenna 63, and p2 represents a transmission power of the second antenna 64. In the closed-loop mode 2, a desired transmission power, that is, amplitude is selected from two candidates, and a desired phase value is selected from 8 candidates, so there are 16 combinations of weight vectors. As a result, 4-bit information is necessary as feedback information from the mobile station to the base station. In this case, the FBI bits in one slot is 1 bit similar to the closed-loop mode 1, so FBI bits of four slots are used to transmit one feedback information.

Hence, the problem of the conventional case as described in the first embodiment also arises in the closed-loop mode 2. That is, in the conventional antenna verification method that selects an estimated value of the weight vector from two weight vector candidates that represent whether or not a bit error occurs in one FBI bit, if an erroneous judgment is made in the past antenna verification, the correct channel estimation cannot be performed through antenna verification for subsequent time slots, which determines a candidate phase offset value based on the past erroneous judgment result.

If the present invention is applied to the wireless receiving apparatus of the closed-loop mode 2, the antenna verification unit 19 of the wireless receiving apparatus 1 of the first embodiment is set to estimate a weight vector corresponding to the closed-loop mode 2. Furthermore, the judgment history holding unit 26 is set to hold a judgment history for 3 previous slots. As a result, if it is determined that a bit error occurs in the FBI bit received by the base station upon the antenna verification for previous slots, the judgment can be performed by adding the third candidate value, that is, a candidate phase offset value in the case where no bit error occurs in the FBI bit upon the past antenna verification, at the time of antenna verification for subsequent slots. Thus, the wireless receiving apparatus of the present invention can select a correct phase offset value even if an erroneous judgment is made in the past antenna verification, and the channel estimation can be accurately executed with no influence of the erroneous judgment.

Further, although in the processing flow of the antenna verification of FIG. 2, the correlation degree S1 calculated from the first candidate phase value and the correlation degree S2 calculated from the second candidate phase value are compared with each other and then with the correlation degree S3 calculated from the third candidate phase value. However, the three correlation degrees may be collectively compared with one another.

Further, the processing flow of the antenna verification of FIG. 2 is given by way of example, and can be variously modified. For example, weighting is performed such that an FBI bit reception error is hard to determine based on a rate of occurrence of the FBI bit reception errors, and a phase offset is estimated in some cases. In this case as well, once an erroneous judgment is made upon the antenna verification, the channel estimation cannot be accurately executed for a subsequent slot. Therefore, the present invention is effective for such a case. In summary, the present invention is effective for an antenna verification method where a phase offset or FBI bit estimation result upon the antenna verification for a given slot influences a phase offset estimation for a subsequent slot.

In the above first embodiment, if it is determined that a bit error occurs in the FBI bit received at the base station, the judgment is made while adding the third candidate phase value upon the next antenna verification. As a further modified example, the judgment may be carried out by use of a fourth candidate phase value in addition to third candidate phase value. In this case, the fourth candidate phase value is an expected phase offset value in the case where an erroneous judgment was made in the past antenna verification, and the base station makes an error in receiving the FBI bit for a present time slot as a verification target. Hence, even if an FBI bit reception error occurs in a time slot subsequent to the time slot for which the antenna verification error occurs, an appropriate phase offset value can be selected.

To be specific, for example, if the first candidate phase value is $3\pi/4$ radians based on (FBI_e, FBI_o)=(1,0), the second candidate phase value is $-3\pi/4$ radians based on (FBI_e, FBI_o) =(1,1), and the third candidate phase value is $\pi/4$ radians based on (FBI_e, FBI_o)=(0,0), the fourth phase candidate value is $-\pi/4$ radians based on (FBI_e, FBI_o)=(0, 1).

Further, the above embodiments describe the case where the present invention is applied to the wireless receiving apparatus of the W-CDMA mobile communication system. However, the application of the present invention is not limited to this configuration. According to the present invention, based on the result of antenna verification at a given timing, a candidate value of the weight vector is changed for the following antenna verification that reflects the antenna verification result. Hence, the present invention can be applied to wireless receiving apparatuses that carry out antenna verification for estimating a weight vector added to a transmission signal in the closed-loop transmit diversity scheme.

It is apparent that the present invention is not limited to the above embodiment that may be modified and changed without departing from the scope and spirit of the invention.

What is claimed is:

1. A wireless receiving apparatus capable of communicating with a wireless transmitting apparatus that implements a closed-loop transmit diversity scheme using a first antenna and a second antenna, comprising:

an antenna verification unit verifying a weight vector added to at least one of a signal sent from the first antenna and a signal from the second antenna by the wireless transmitting apparatus based on feedback information from the wireless receiving apparatus, wherein the antenna verification unit compares a reception signal with a plurality of weight vector candidate values that are determined based on a previously verified weight vector to select a weight vector set by the wireless transmitting apparatus from the plurality of weight vector candidate values, and if a weight vector added to a signal received from the wireless transmitting apparatus does not match a weight vector that is determined based on the feedback information in the past verification of the weight vector, the antenna verification unit execute verification by adding to the plurality of candidate values, a weight vector candidate value obtained when the weight vector determined in the past verification is assumed as the weight vector that is determined based on the feedback information.

2. The wireless receiving apparatus according to claim 1, further comprising:
a combination unit complementing phase variations of multipath components from the wireless transmitting apparatus by use of a weight vector verified with the antenna verification unit and combining the multipath components.

3. The wireless receiving apparatus according to claim 1, further comprising:
a judgment history holding unit holding a judgment result of the antenna verification unit,
wherein information about whether or not a weight vector verified with the antenna verification unit matches a weight vector that is determined based on the feedback information is recorded in the judgment history holding unit.

4. The wireless receiving apparatus according to claim 3, wherein the antenna verification unit changes the plurality of weight vector candidate values in accordance with the judgment result held in the judgment history holding unit.

5. The wireless receiving apparatus according to claim 1, wherein the wireless receiving apparatus is provided opposite to the wireless transmitting apparatus that implements a transmit diversity scheme of a closed-loop mode 1 of W-CDMA,
the feedback information is the FBI bit sent to the wireless transmitting apparatus through an up DPCH, and
the weight vector is a phase offset applied to a transmission signal from the second antenna based on the FBI bit.

6. The wireless receiving apparatus according to claim 5, wherein if a phase offset of a signal received from the wireless transmitting apparatus is determined not to match a phase offset based on the FBI bit upon verification of the phase offset in a previous time slot, the antenna verification unit selects a phase offset set by the wireless transmitting apparatus from a first candidate phase value derived from a combination of a first FBI bit corresponding to a time slot as a verification target and a second FBI bit of a slot previous to the first FBI bit, a second candidate phase value derived from a combination of an inverted bit of the first FBI bit and the second FBI bit, and a third candidate phase value derived from a combination of the first FBI bit and an inverted bit of the second FBI bit.

7. The wireless receiving apparatus according to claim 6, wherein if the phase offset of the signal received from the wireless transmitting apparatus is determined not to match a phase offset based on the FBI bit upon verification of the phase offset in the previous time slot, the antenna verification unit executes verification by adding a fourth candidate phase value derived from a combination of an inverted bit of the first FBI bit and an inverted bit of the second FBI bit.

8. The wireless receiving apparatus according to claim 1, wherein the weight vector is at least one of a phase difference and an amplitude difference between the signal sent from the first antenna and the signal sent from the second antenna.

9. An antenna verification method that is executed by a wireless receiving apparatus capable of communicating with a wireless transmitting apparatus that implements a closed-loop transmit diversity scheme using a first antenna and a second antenna, comprising:

selecting a weight vector added to at least one of a signal sent from the first antenna and a signal from the second antenna by the wireless transmitting apparatus based on feedback information from the wireless receiving apparatus from a plurality of weight vector candidate values that are determined based on a previously verified weight vector;
determining whether or not a weight vector verified in the past verification of the weight vector matches a weight vector that is determined based on the feedback information;
setting, if the weight vector verified in the past verification of the weight vector does not match the weight vector that is determined based on the feedback information, a plurality of weight vector candidate values including a weight vector candidate value obtained when the weight vector determined in the past verification is assumed as the weight vector that is determined based on the feedback information; and
comparing a reception signal with the plurality of weight vector candidate values to select a weight vector set by the wireless transmitting apparatus from the plurality of weight vector candidate values.

10. The antenna verification method according to claim 9, wherein the wireless receiving apparatus is provided opposite to the wireless transmitting apparatus that implements a transmit diversity scheme of a closed-loop mode 1 of W-CDMA,
the feedback information is the FBI bit sent to the wireless transmitting apparatus through an up DPCH, and
the weight vector is a phase offset applied to a transmission signal from the second antenna based on the FBI bit.

11. The antenna verification method according to claim 10, wherein if a phase offset of a signal received from the wireless transmitting apparatus is determined not to match a phase offset based on the FBI bit upon verification of the phase offset in a previous time slot, a phase offset set by the wireless transmitting apparatus is selected from a first candidate phase value derived from a combination of a first FBI bit corresponding to a time slot as a verification target and a second FBI bit of a slot previous to the first FBI bit, a second candidate phase value derived from a combination of an inverted bit of the first FBI bit and the second FBI bit, and a third candidate phase value derived from a combination of the first FBI bit and an inverted bit of the second FBI bit.

12. The antenna verification method according to claim 11, wherein if the phase offset of the signal received from the wireless transmitting apparatus is determined not to match a phase offset based on the FBI bit upon verification of the phase offset in the previous time slot, verification is executed by adding a fourth candidate phase value derived from a combination of an inverted bit of the first FBI bit and an inverted bit of the second FBI bit.

13. An antenna verification method that is executed by a wireless receiving apparatus capable of communicating with a wireless transmitting apparatus that implements a closed-loop transmit diversity scheme of a closed-loop mode 1 of W-CDMA using a first antenna and a second antenna, comprising:
selecting a phase offset added to the second antenna by the wireless transmitting apparatus based on an FBI bit from the wireless receiving apparatus from a plurality of phase offset candidate values that are determined based on a previously verified phase offset;
selecting, if a phase offset of a signal received from the wireless transmitting apparatus is determined not to match a phase offset based on the FBI bit upon verification of the phase offset in a previous time slot, a phase offset set by the wireless transmitting apparatus from a first candidate phase value derived from a combination of a first FBI bit corresponding to a time slot as a verification target and a second FBI bit of a slot previous to the first FBI bit, a second candidate phase value derived from a combination of an inverted bit of the first FBI bit and the second FBI bit, and a third candidate phase value derived from a combination of the first FBI bit and an inverted bit of the second FBI bit; and selecting, if a phase offset of a signal received from the wireless transmitting apparatus is determined matches a phase offset based on the FBI bit upon verification of the phase offset in a previous time slot, a phase offset set by the wireless transmitting apparatus from the first candidate phase value and the second candidate phase value.

* * * * *